(12) United States Patent
Gupta et al.

(10) Patent No.: US 8,000,270 B2
(45) Date of Patent: Aug. 16, 2011

(54) CONTENT DOWNLOADING OVER TDM WITH DOWNLOAD PAUSING

(75) Inventors: Shekhar Gupta, Overland Park, KS (US); Johnny Hawkins, Kansas City, MO (US); Rich Schermerhorn, Overland Park, KS (US); Victoria M. Toner, Sheboygan, WI (US); Mike A. Roberts, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 155 days.

(21) Appl. No.: 12/167,451

(22) Filed: Jul. 3, 2008

(65) Prior Publication Data

US 2010/0002718 A1   Jan. 7, 2010

(51) Int. Cl.
  *H04L 12/16* (2006.01)
(52) U.S. Cl. .................................. 370/271; 379/201.05
(58) Field of Classification Search ........................ None
  See application file for complete search history.

(56) References Cited

U.S. PATENT DOCUMENTS

| | | | | |
|---|---|---|---|---|
| 5,477,532 A | * | 12/1995 | Hoshigami et al. | 370/277 |
| 6,188,886 B1 | * | 2/2001 | Macaulay et al. | 455/415 |
| 6,560,239 B1 | * | 5/2003 | Frid et al. | 370/426 |
| 7,058,429 B2 | * | 6/2006 | Fujito et al. | 455/567 |
| 2004/0235483 A1 | * | 11/2004 | Sylvain | 455/445 |
| 2006/0033809 A1 | * | 2/2006 | Farley | 348/14.01 |
| 2006/0043164 A1 | * | 3/2006 | Dowling et al. | 235/375 |

* cited by examiner

*Primary Examiner* — Kwang B Yao
*Assistant Examiner* — Alex Skripnikov
(74) *Attorney, Agent, or Firm* — SNR Denton US LLP (57) ABSTRACT

A telecommunications device and method for downloading content using Time Division Multiplexing (TDM) includes receiving a request for content to be downloaded using TDM. The content may be communicated in response to receiving the content request. In response to receiving a call request for use of a telephone line, a download status of the telephone line may be determined. If the download status of the telephone line is indicative of content being downloaded, the content may be suspended from being communicated to enable a call associated with the call request to be connected with the telephone line. Otherwise, if the download status of the telephone line is not indicative of content being downloaded, a call associated with the call request may be connected with the telephone line.

17 Claims, 6 Drawing Sheets

CONTENT DOWNLOADING OVER TDM WITH DOWNLOAD PAUSING

BACKGROUND OF THE INVENTION

The past decade has seen a tremendous increase in the use of cellular phones, Voice-Over-Internet Protocol (VoIP) phones, and other types of communication devices beyond traditional TDM based telephones or "land line" telephones. Along with the increase in cellular and VoIP phone usage is a phenomenon known as "cutting the cord"—where a subscriber relies solely on cellular or non-traditional telephone services, such as VoIP phones rather than a land line, and which is occurring more frequently than ever.

The rise in popularity of the use of cellular phones and other alternative communication devices and protocols can be attributed to many things, one being the advanced functionality and customizations that they provide. Even the most basic cellular phones today allow you to download ring tones, screen savers, and wallpaper in order to customize your cellular phone. Ring tones, screen savers, and wallpaper may be offered for download directly from the cellular service provider or may be downloaded from third parties that have begun to offer a variety of customizing products. Downloads, such as ring tones, are generally inexpensive for the subscriber, but provide additional revenue for service providers and third party vendors. Consumers have shown a willingness to spend money for ring tones, face plates, wallpaper, screen savers, and other products in order to have their phone reflect their personality, and the market for customizing products has proven to be quite lucrative.

Currently, traditional TDM based phones do not have many of the advanced functionalities that cell phones provide. At least in part due to the lack of features and customizations that are available on other networks or using other different devices, traditional TDM based phones are declining in use and seem to be less desired by subscribers over time.

BRIEF SUMMARY OF THE INVENTION

By providing a telecommunications device and method for allowing the downloading of content, such as ring tones, over a TDM network, telephones capable of operating over a traditional TDM network may help to retain traditional TDM telephone customers, as well as provide additional revenue for service providers and third party vendors. Because data communications over a TDM network is inherently slow, through the use of a web portal interfacing with a switch at a central office, a download status may be maintained to allow content being downloaded to be paused and resumed as incoming or outgoing calls occur, thereby enabling a customer to download content without preventing telephone usage.

One embodiment includes a method for downloading content using Time Division Multiplexing (TDM). The method includes receiving a request for content to be downloaded using TDM. The content may be communicated in response to receiving the content request. In response to receiving a call request for use of a telephone line, a download status of the telephone line may be determined. If the download status of the telephone line is indicative of content being downloaded, the content may be suspended from being communicated to enable a call associated with the call request to be connected with the telephone line. Otherwise, if the download status of the telephone line is not indicative of content being downloaded, a call associated with the call request may be connected with the telephone line.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
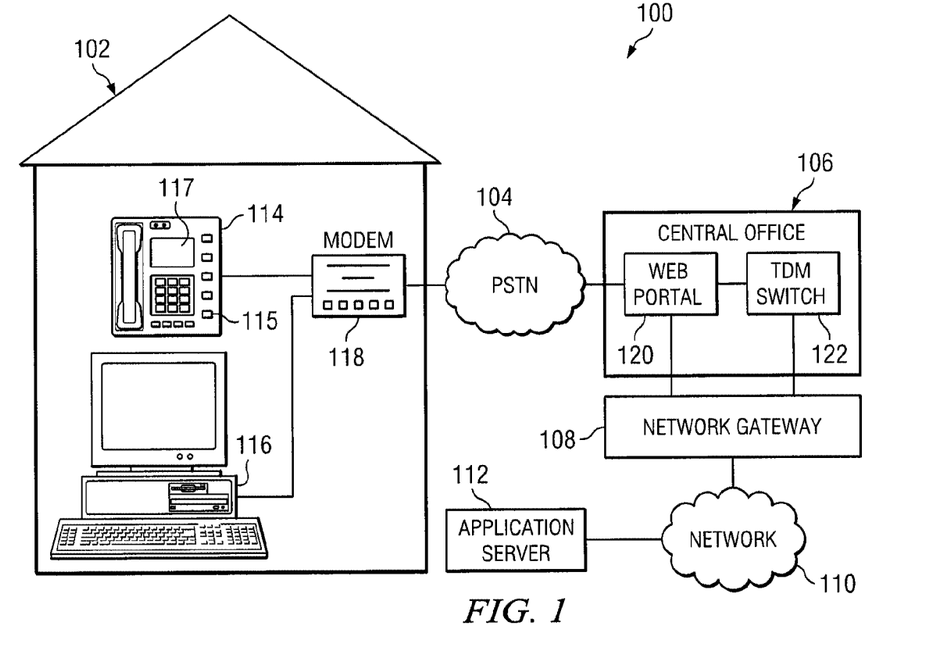
FIG. 1 is an illustration of an exemplary environment for downloading content using Time Division Multiplexing (TDM)

FIG. 1 is an illustration of an exemplary environment 100 for downloading content using Time Division Multiplexing (TDM). In this embodiment, a subscriber location 102 may communicate via the public switched telephone network (PSTN) 104 to a central office 106. The central office 106 may further be in communication with a network gateway 108 that may communicate via a network 110 with an application server 112.

Within the subscriber location 102 may be a modified telephone 114 or a computing device 116 that may communicate via a modem over the PSTN 104. The modified telephone 114 may differ from a traditional TDM telephone in that it may be modified to include memory 115 for storing the content that is downloaded to the modified telephone 114. Alternatively, the modified telephone 114 may include a USB port (not shown) or any other type of port capable of accepting external memory, such as a flash drive or any other type of memory, for storing downloaded content. Content may include any downloadable data, including audio (e.g. ring tones, music) and visual (e.g., photographs, screen savers, video) data. In addition to memory modifications, the modified telephone 114 may include a display screen 117 that provides a menu of selectable content available to be downloaded, content that has previously been downloaded, management of the lists of downloaded content, or various other features. The menu may be generated from data received from the web portal 120 or may be generated from data stored locally within the modified telephone 114, among other sources. The modified telephone 114 may be capable of requesting the content directly from the web portal 120 via an external modem 118 or content may be requested using a separate computing device 116. In an alternative embodiment, a modem (not shown) may be included within the modified telephone 114, making the addition of the external modem 118 between the modified telephone and the PSTN unnecessary. The modified telephone 114 will be described in greater detail below in reference to FIG. 2.

Within the subscriber location 102 may also be a computing device 116 configured to communicate over the PSTN 104 to the web portal 120. The computing device 116 may be configured to access the web portal 120 via the external modem 118 or an internal modem (not shown) without interfacing with the modified telephone 114. Alternatively, any computing device, whether or not located at the subscriber location 102 may be able to access the web portal 120 via the network 110, such as the Internet.

The web portal 120 may be located within the central office 106 and may be in communication with a TDM switch 122. The web portal 120 may also be located in communication with a network gateway 108, providing accessibility with the web portal 120 from any device located in communication with the network 110. In an exemplary embodiment, the network 110 may the Internet, but the network 110 may also be any other type of network configured to communicate with the web portal 120. Alternatively, the web portal 120 may be located anywhere within the network 110, including outside of the central office 106. However, the web portal should be in communication with the TDM switch 122.

Functionality of the web portal 120 includes receiving requests for content from subscribers regarding content to download, communicating the requests for content to an application server 112, tracking the status of downloads to the subscriber location 102, and alerting the TDM switch 122 of the download status, among other functionalities. These functionalities, as well as others, are described in greater detail in FIG. 5 below.

Additionally, the web portal 120 may be accessed by a computing device 116 or any other computing device (not shown) in communication with the web portal 120. An account may be created associating a subscriber location 102 and modified telephone 114 with the account. When the web portal 120 is accessed by using a subscriber location associated login, the correct subscriber location 102 for a download to be communicated may be determined regardless of the location of a person accessing the web portal.

Application server 112 may contain content that is available to be downloaded to the subscriber location 102. The application server 112 may be accessed by any computer connected to the network 110 or may be accessed by the web portal 120. In one embodiment, the application server 112 may be called by the modified phone 114 via the PSTN and a TDM switch to initiate a content download session. The application server 112 may routinely communicate to the web portal 120 a listing of available content for download or may be queried on an as needed basis. Although there is only one application server 112 depicted, there may be any number of application servers accessible by the web portal 120 for providing content to be downloaded.

Figure 2:
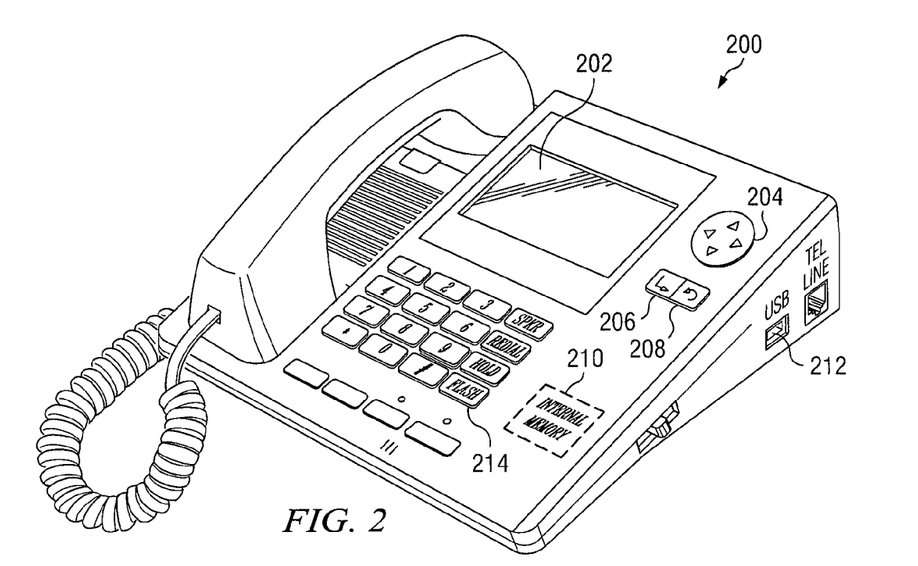
FIG. 2 is an illustration of a modified telephone configure to download content using TDM.

FIG. 2 is an illustration of a modified telephone 200 capable of downloading content using TDM. A display screen 202 may be integrated into the modified telephone 200. The display screen 202 is optional, however, as a menu or menus for selecting and initiating the download of content may be provided through non-visual means, such as through audio prompts. A selection button 204 may also be present for navigating through a menu on the screen. Alternatively, the number keys, such as those found on a traditional telephone, may be used for navigating a menu provided on the display screen 202 or audio prompts. An enter button 206 and a back button 208 may additionally appear on the phone for use in navigating the menu on the display screen 202.

Internal memory 210 may also be installed within the phone for storing content that is downloaded, software modules for the menu, or any other type of data capable of being stored in memory. In addition or alternatively to the internal memory 210 is a memory port 212, where a memory device, such as a USB flash drive or any other type of memory capable of storing the content, may be inserted.

Another modification that may be made to the modified telephone 200 is the addition of a flash button 214. Some existing phones already have a flash button. However, the functionality of the flash button 214 on the modified telephone 200 may be expanded to provide additional features. In one embodiment, the flash button 214 may be modified to request a phone line for placing a call in the event the phone line is currently being used to download content. In response to the flash button 214 being pressed, a signal may be sent to a network switch through which the modified telephone 200 communicates to alert the web portal to pause the downloading of content for the telephone call. In an alternative embodiment, a user may interact with a user interface, such as one displayed on the display screen 202, to generate a phone line request. A more detailed description of the implementation of the flash button is described below in reference to FIG. 7.

Figure 3:
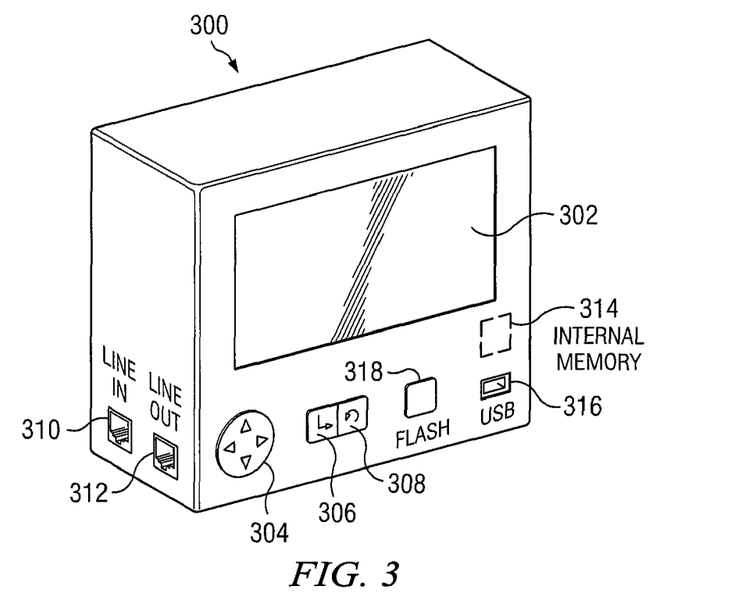
FIG. 3 is an illustration of a telecommunications device capable of downloading content using TDM.

FIG. 3 is an illustration of a telecommunications device 300 capable of downloading content using TDM. The telecommunications device 300 may be located between a traditional telephone that has not been modified and a modem connected to a telephone outlet. The telecommunications device 300 may provide similar functionality as the modified telephone 200 without the need to purchase a new, modified phone. The telecommunications device 300 may include a display screen 302, controls 304 for operating a menu on the display screen 302 an enter button 306 for selecting items on the display screen, and a back button 308 for returning to a previous screen (or voice menu). In order to interface with the telephone as well as the modem, a "line in" jack 310 and a "line out" jack 312 may be included. The traditional telephone may be plugged into the line out jack 312 with a telephone cord being plugged into the line in jack 310 that connects to the modem. In an alternative embodiment, a modem (not shown) may be included within the telecommunications device 300. Rather than communicating via an external modem and the telephone outlet, a direct connection to the telephone outlet may be used from the line in jack 310.

Content that is downloaded may be stored on the internal memory 314 or on removable memory that may be inserted into the memory slot 316. In one embodiment, the memory slot 316 accepts a flash drive that transfers information using USB. No particular type of memory is required, as any form of memory capable of storing the content may be used.

Similar to the modified phone of FIG. 2, the telecommunications device 300 may include a flash button 318 for requesting a telephone line. For example, in the event that a subscriber would like to place a call while the telecommunications device 300 is downloading, the subscriber may press the flash button to signal for the download to be suspended and request to free the line for a call. The flash button may act as an alert to a network switch and web portal that a call is being placed, thereby causing the download of the content to suspend and sending an on-hook signal to the phone. A more detailed discussion of the implementation follows in reference to FIG. 7.

Figure 4:
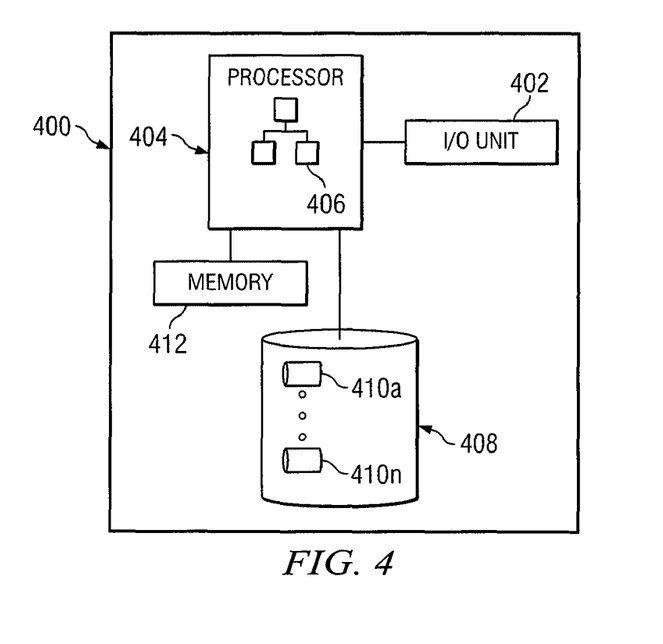
FIG. 4 is a block diagram of exemplary components of a telecommunications device configured to facilitate downloading content using TDM.

FIG. 4 is a block diagram of exemplary components of a telecommunications device 400 configured to facilitate downloading content using TDM. An exemplary telecommunications device 400 may be the modified telephone 200 as in FIG. 2 or the telecommunications device 300 as in FIG. 3. The telecommunications device 400 may include an input/output (I/O) unit 402 for receiving content and communicating various requests, such as the selection of content to download and a request, as initiated by the flash button described previously, for a line to place an outgoing call. The I/O unit 402 may additionally include a modem (not shown) or similar functionality of a modem for connecting to the web portal or application server as described above. The telecommunications device 400 may also include a processor 404 for processing the storing of content, the selection of the content, and the generation of the display screen, among other functions. The processor 404 may execute software 406 capable of performing the functionality of the telecommunications device 400. Software modules that operate in the processor 404 are described below in more detail in reference to FIG. 5.

Memory 412 may also be located within the telecommunications device 400 for storing data being processed by the processor 404. A data repository 408 may also be included in or may be in communication with the telecommunications device 400. The data repository 408 may be a hard drive or any other type of volatile or non-volatile memory capable of storing downloaded content. Within the data repository 408 may be one or more data repositories 410*a*-410*n*, such as a database or multiple databases, capable of storing and organizing the content, such as ring tones or wallpaper. In one embodiment, rather than including the data repository 408, the telecommunications device 400 may use a memory 412 that is large enough to store downloaded content.

Figure 5:
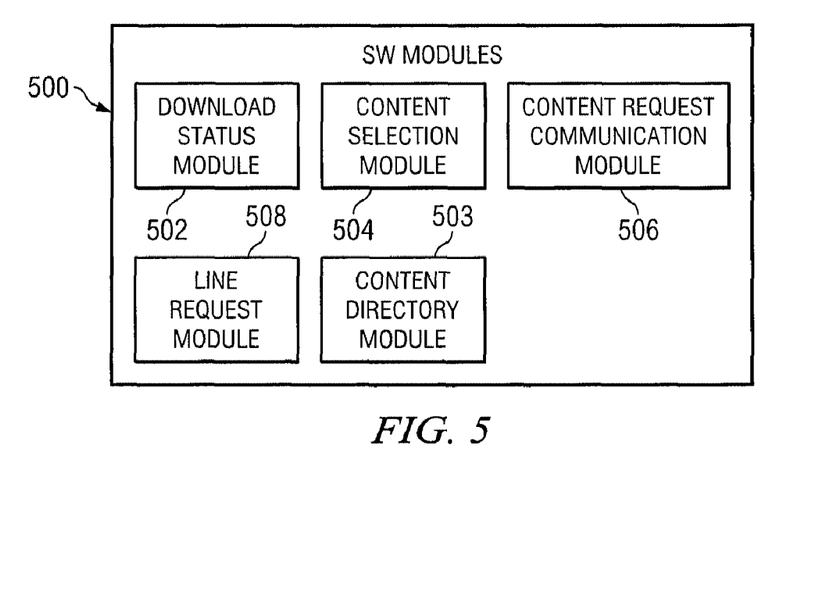
FIG. 5 is a block diagram of exemplary software modules for downloading content using TDM.

FIG. 5 is a block diagram of exemplary software modules 500 for downloading content using TDM. Some of the software modules 500 may be located and processed within a telecommunications device, such as a modified phone 200 as described in FIG. 2 or intermediary telecommunications device 300 as described in FIG. 3, and some of the software modules 500 may be located and processed within a web portal, such as web portal 120 as described in FIG. 1.

A download status module 502 may operate on the web portal and may keep track of information on the status of downloads occurring at a subscriber location. When a request to download content is received by a web portal, the download status module 502 may be utilized to determine is the subscriber location is currently downloading content. If the status reflects that content is not currently being downloaded (e.g. the status is "free"), a content directory module 503 may be initiated to provide the location information, such as the telephone number to an application server with access to the content, and the status may be updated by the download status module 502 to reflect that a download is occurring at the subscriber location.

When a call is received for a subscriber location, the download status module 502 may be utilized to determine if a download is currently taking place at the particular subscriber location. If a download is not taking place, a network switch may connect the call, as is customary when a switch has an on-hook signal upon a call being received. If a download is taking place (e.g. the status is "download"), the download status module 502 may return the information to the network switch. The network switch, in turn, may send a request to the application server communicating the content to pause the download. An acknowledgement may be returned from the application server to the network switch that the download has been paused. The switch may then alert the web portal, at which time the download status module 502 changes the download status for the subscriber location (e.g. the status is "suspend"). Upon receiving confirmation that the call has ended by the network switch, the download status module 502 may be notified, triggering the download status to reflect the resumption of the download (e.g. "download"). Additional details regarding the timing will be described below in regard to FIG. 7.

The content directory module 503 may serve to provide access to a directory of content available for subscriber downloading. The content directory may include organizing and accessing a listing of information found on remote application servers that the subscriber may access by dialing directly to the remote application servers or may include organizing and accessing information on locally stored content that may be accessed by the subscriber location.

A content selection module 504 may also operate either at the subscriber location, web portal, or both. From the subscriber location, within a modified telephone or telecommunication device, the content selection module 504 may provide a menu and accept input from a user as to what content the user would like to download. The content selection module 504 may work in combination with a content request communication module 506. Upon determining a selection, the content selection module 504 may utilize the content request communication module 506 to communicate the request to the web portal.

In an alternative embodiment, the content selection module 504 is located within the web portal and provides the functionalities from within the web portal. The modified telephone or telecommunications device may be configured to access the content selection module 504 directly on the web portal by dialing the web portal with a pre-configured telephone number. In this embodiment, commands may be sent from the modified telephone, the telecommunications device, or from a computing device that communicates over a network with the web portal, which also may be located in communication with the network, such as the Internet.

The line request module 508 may be initiated by the modified telephone, the telecommunications device, or by the network switch. In the event that a download is in progress and the subscriber wants to place a telephone call, a button, such as the flash button located on the modified telephone or telecommunications device, may initiate the line request module to request an "on-hook" status for the subscriber location so that a telephone call can occur. In the event a call comes in from the PSTN for the subscriber location and the download status indicates a download is in progress, the line request module may be run from the web portal to initiate the process of suspending the download. The line request module 508 may notify the application server in which the subscriber location is connected to suspend the download. Upon confirmation from the application server that the download is suspended, an on-hook status signal, followed by the telephone call, may then be transmitted to the subscriber location.

Figure 6:
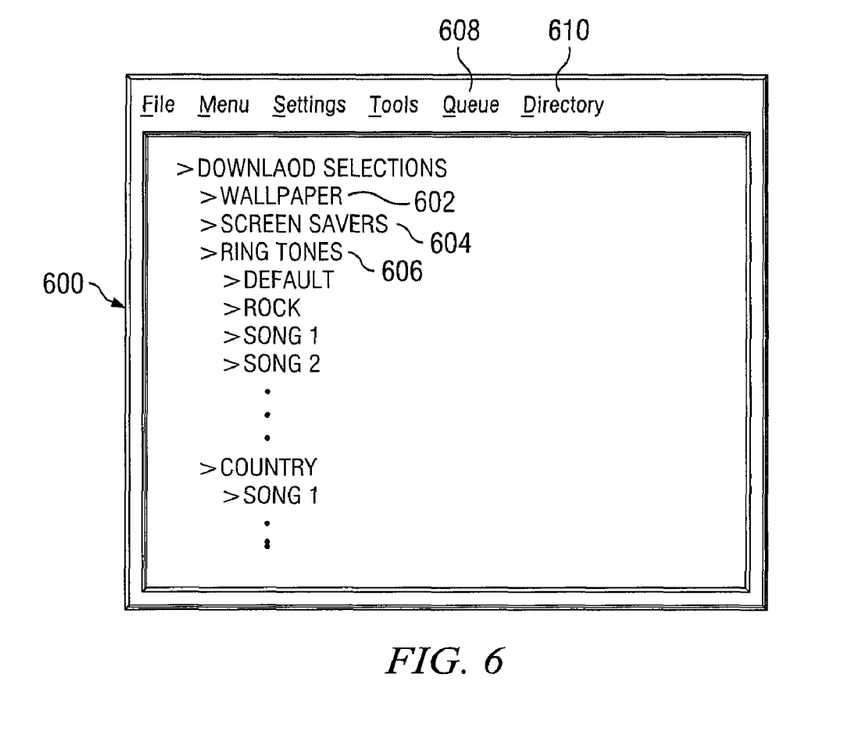
FIG. 6 is an illustration of an exemplary screen shot for selecting the content to be downloaded using TDM.

FIG. 6 is an illustration of an exemplary screen shot 600 for selecting the content to be downloaded using TDM. The screen shot 600 may be presented on a modified telephone, a telecommunications device, or through a web browser on a computing device that is connected directly to the web portal. By presenting the screen shot 600 to the user, one or more selections may be made for content to be downloaded to the subscriber location. If the selection is made at the subscriber location from the modified telephone or telecommunications device, the selection may be transmitted to the web portal using the content request communication module 506, as described in FIG. 5. In an alternative embodiment, the web portal may be in communication with a network, such as the Internet. From a web browser, operating on a computing device, a similar display, such as display screen 600, may be presented for selection of content. A login may be used in order to associate the subscriber location with the computing device accessing the web portal. This may be necessary when accessing the web portal outside of the subscriber location. In one embodiment, a listing of categories content, such as wallpaper 602, screen savers 604, and ring tones 606, may be expanded to display the content available. A listing of the content previously selected and currently waiting to be downloaded may also be accessed by selecting Queue 608 from the menu bar.

In addition to the ability to select content to download, the ability to select and access the content that has been downloaded may also be provided. To select and access content that has been previously downloaded, selecting Directory 610 from the listing may provide an additional menu (not shown) with the content available for a subscriber to choose.

Figure 7A:
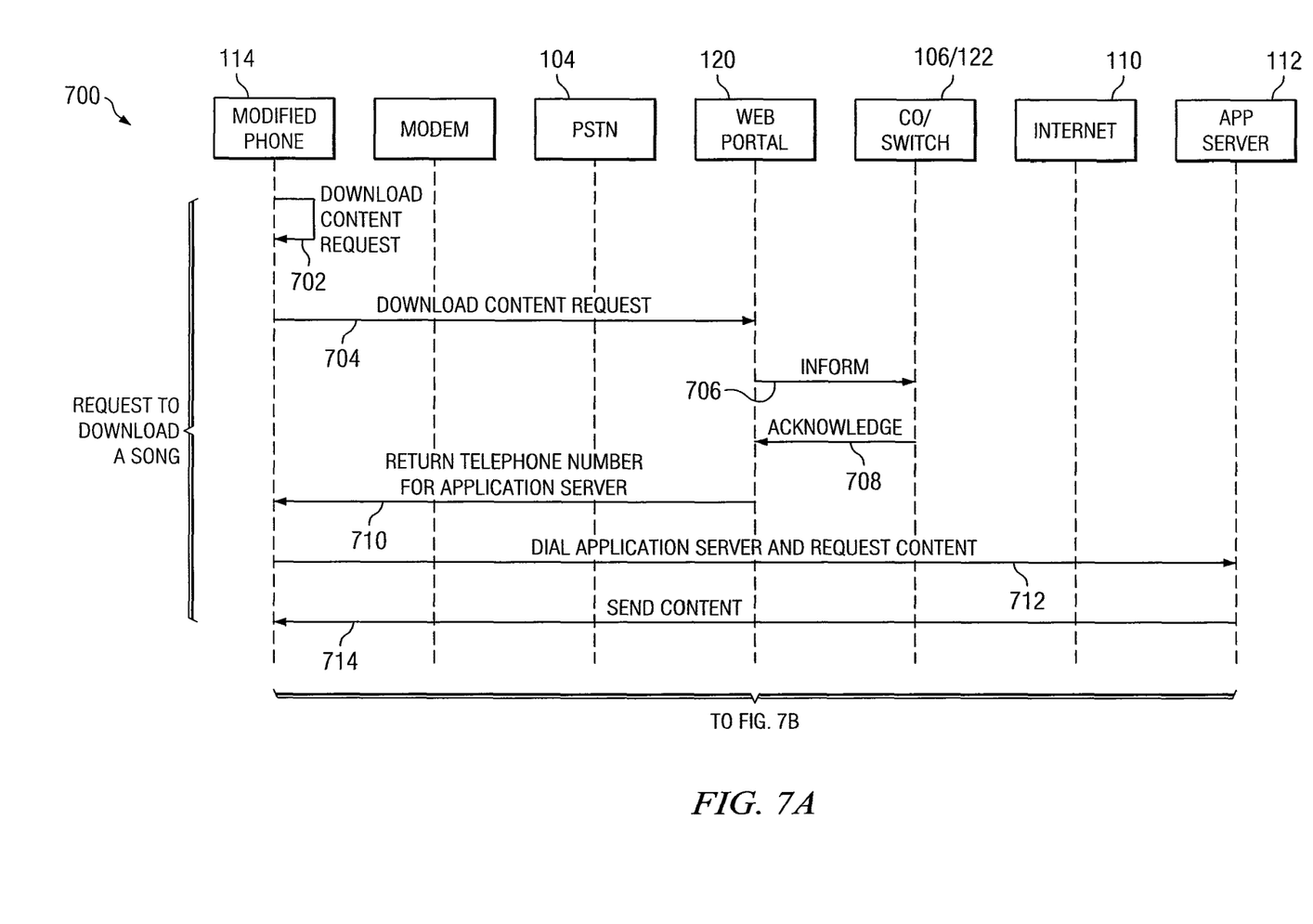
FIG. 7 is a timing diagram for an exemplary embodiment for downloading content using TDM and pausing the download upon a call request.
Figure 7B:
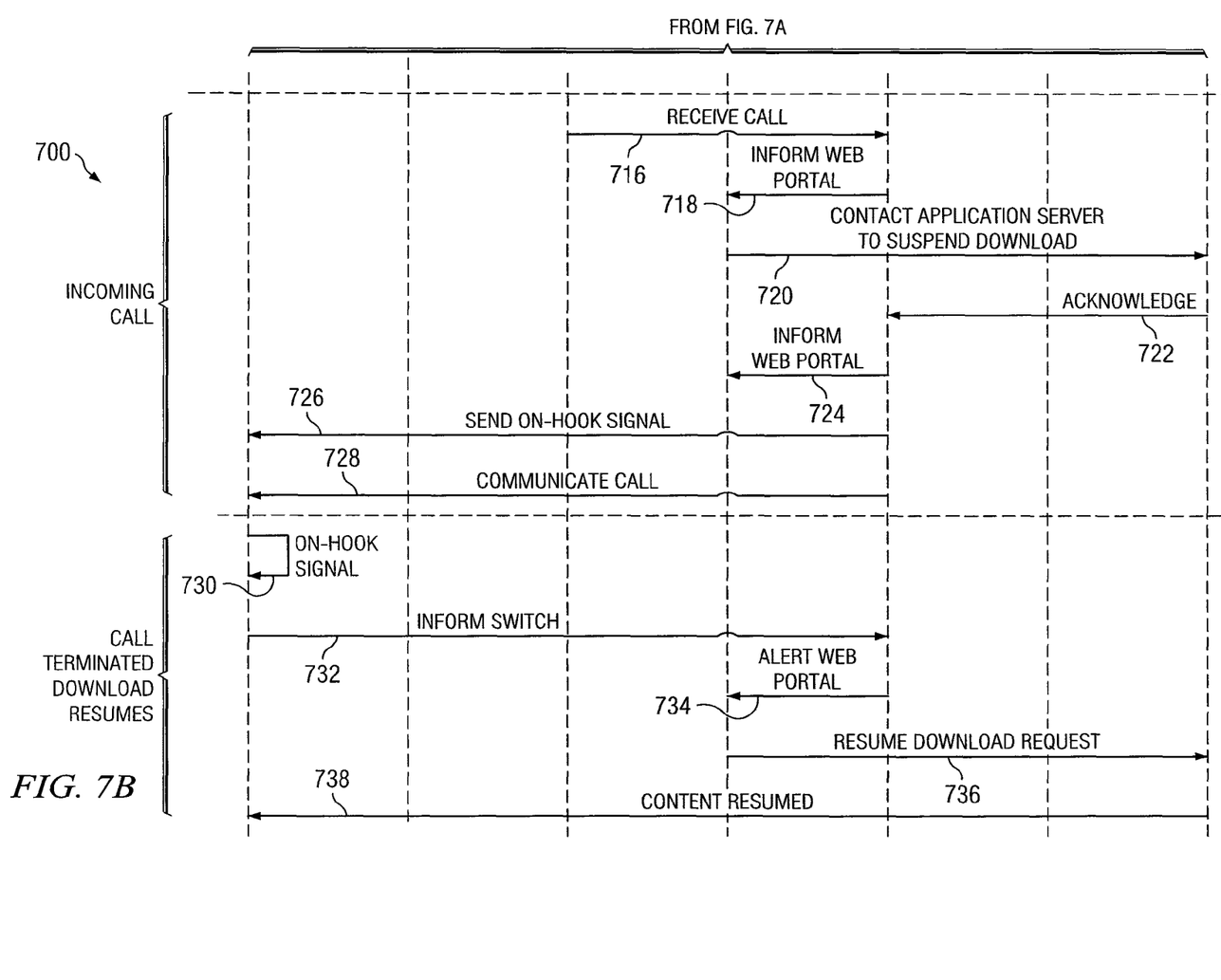

FIG. 7 is a timing diagram 700 of an exemplary embodiment for downloading content using TDM and pausing the download upon a call request. In one embodiment, the modified phone 114 may receive a request from a subscriber using the modified phone 114 to download content at step 702. Prior to this step, a selection may have already been made by the user via the display screen 600, such as described in FIG. 6. Web portal 120 may be alerted to the request at step 704. At step 706, the Central Office (CO)/switch 106 where switch 122 is located is informed that a download is to take place with a subscriber location by the modified phone 114. The switch 122 acknowledges the web portal at step 708. Upon receipt of the acknowledgment, the web portal 120 may transition a download status flag to indicate that the subscriber location is currently downloading content. At step 710, the web portal 120 returns the telephone number for the application server 112 that stores the content to be downloaded. The application server 112 may be dialed and the content request communicated at step 712. At step 714, the content is transmitted from the application server 112 to the modified telephone 144 at the subscriber location. In an alternative embodiment, the content is transmitted to an attached telecommunications device (FIG. 3) rather than the modified telephone 144.

During the download, a call intended for the subscriber location may be received at the central office 406 from the PSTN 104 at step 716. A switch 122 located at the central office 106 may inform the web portal 120 at step 718 that there is a call for the modified phone 114. The web portal 120 may contact the application server 112 to suspend the download for the subscriber location at step 720. At step 722, the application server 112 may send an acknowledgement to the switch 122 that the download has been suspended. The switch 122, at step 724, may then send notification to the web portal 120 that the download has been suspended. The web portal 120 may transition the download status flag to indicate that content is no longer being downloaded at this point, as well. At step 726, the switch 122 may send an on-hook signal to the modified phone located at the subscriber location. At step 728, the call may then be communicated to the modified phone.

When the call has been completed, an on-hook or "available" signal may be generated at step 730. The switch may be informed that the phone has gone on-hook at step 732. At step 734, the web portal 120 is alerted that the modified phone has gone on-hook. In response to being alerted that the modified phone 114 is on-hook, the download status flag may be transitioned to indicate that content is now being downloaded again. The web portal 120 may send the resume request to the application server 112 at step 736. The content download between the application server 112 and the modified phone 114 may resume at step 738.

Figure 8:
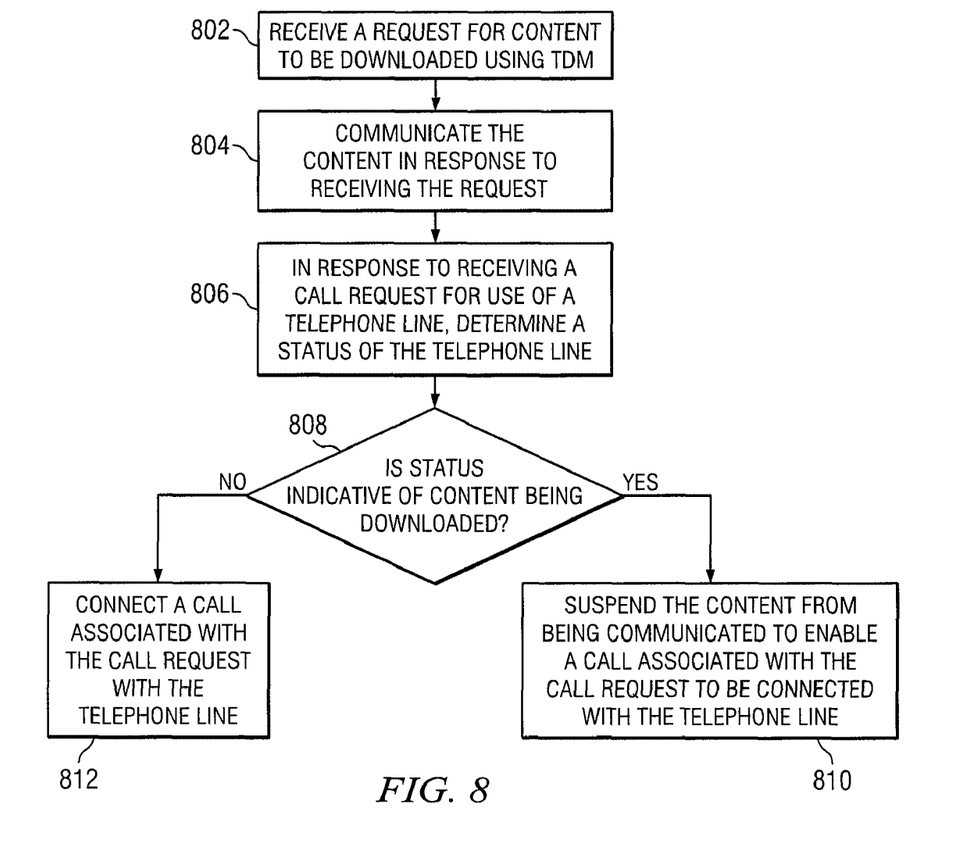
FIG. 8 is a block diagram of an exemplary method for downloading content using TDM.

FIG. 8 is a block diagram of an exemplary process 800 for downloading content using TDM and pausing the download upon a call request. In step 802 a request for content to be downloaded using TDM may be received. The request may be generated from the subscriber location on a modified phone or telecommunications device, as described previously. The request may also be generated from a computing device in communication with the web portal, either through the PSTN or another network, such as the Internet.

In step 804, the content may be communicated in response to receiving the request. The content may be communicated over TDM directly to the subscriber location that sends the request. However, in an alternative embodiment, the request may come from a computing device in which an account associated with the subscriber may be used to determine where the content to be communicated should be directed.

In response to receiving a call request for use of a telephone line, in step 806, a download status of the telephone line may be determined. The download status may indicate whether or not a TDM download of content is currently taking place. Examples of the status may be "download," "free", and "suspend." The download status may be managed by the web portal as described previously. The download status should be distinguished from an on-hook (e.g."free") or off-hook (e.g. "download") status, which is customarily used over a PSTN to determine whether or not a telephone is in use (for a call or otherwise). The download status may also indicate a "suspended" status in the event that a telephone call is received or is generated during a TDM download.

In step 808, the download status of the telephone line may be determined. In step 810, if the download status is indicative of content being downloaded (e.g. "download"), the content communication may be suspended, enabling a call associated with the call request to be connected with the telephone line. As described previously, when the download is to be suspended, the download status indication may be transitioned to indicate that the download is suspended (e.g. "suspend"). Upon completion of the call, the download status indicator may be transitioned to indicate that the download is resumed if there is remaining content to be downloaded.

In step 812, if the download status is not indicative of content being downloaded (e.g. "free"), a call associated with the call request may be connected with the telephone line. In the situation where content was not being downloaded according to the download status, only the on-hook/off-hook signal would need to be changed upon completion of the call.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for downloading content using Time Division Multiplexing (TDM) via a public switched telephone network (PSTN), the method comprising:
   receiving a content request for content to be downloaded to a telephone communicating utilizing TDM through a PSTN telephone line, the content request being received by a web portal directly from the telephone through the PSTN telephone line, the web portal is in communication with a TDM switch that tracks downloads for the telephone, sending a number from the web portal to the telephone for calling an application server storing the content to fulfill the content request;

communicating the content from the application server to the telephone through the PSTN telephone line in response to the telephone dialing the number of the application server and the application server receiving the content request;

setting a download status of the PSTN telephone line in response to communicating the content;

in response to receiving a call request for use of the PSTN telephone line:

determining the download status of the PSTN telephone line;

if the download status of the PSTN telephone line is indicative of content being downloaded, suspending the content from being communicated to enable a call associated with the call request to be connected with the PSTN telephone line;

otherwise, if the download status of the PSTN telephone line is not indicative of content being downloaded, connecting a call associated with the call request with the PSTN telephone line.

2. The method according to claim 1, wherein the web portal communicates with an application server through a gateway and a network in communication with the application server.

3. The method according to claim 1, wherein receiving the call request for a PSTN telephone line includes receiving the call request by a user of the telephone pressing a button to request a call line.

4. The method according to claim 1, wherein receiving the call request for the PSTN telephone line includes receiving the call request from the PSTN, and wherein the content is utilized to customize performance of the telephone utilizing the PSTN telephone line for a user.

5. The method according to claim 1, further comprising communicating an on-hook status of the telephone line in response to the call being terminated.

6. The method according to claim 5, further comprising resuming downloading of the content in response to the on-hook status being communicated.

7. The method according to claim 1, further comprising setting the download status to "suspend" in response to receiving the call request for the PSTN telephone line.

8. The method according to claim 7, further comprising setting the download status back to "download" in response to the call associated with the call request being disconnected from the PSTN telephone line.

9. The method according to claim 8, further comprising resuming downloading the content in response to the download status being set to "download."

10. The method according to claim 1, further comprising storing a list of content available for a user of the telephone connected to the PSTN telephone line to selectively access; and in response to the user selecting particular content in the list, downloading the selected content.

11. The method according to 1, wherein the telephone is a modified telephone operable to download content using TDM.

12. The method according to claim 11, wherein the modified telephone includes a display for controlling download of the content, a flash button, and a memory for storing the content.

13. The method according to claim 12, wherein the flash button switches the modified telephone between downloading the content and carrying on voice communications in response to a user selection.

14. The method according to claim 11, wherein the modified telephone includes a modem for downloading the content.

15. The method according to claim 11, wherein the PSTN telephone line is connected to the telephone and the telephone communicates with a traditional telephone, the telephones includes a display and an interface for controlling downloading of the content.

16. The method according to claim 11, wherein the communications telephone includes modem circuitry for downloading content using TDM.

17. The method according to claim 1, wherein the telephone is connected to an external modem, the telephone receiving the content from the external modem.

* * * * *

UNITED STATES PATENT AND TRADEMARK OFFICE
CERTIFICATE OF CORRECTION

| | | |
|---|---|---|
| PATENT NO. | : 8,000,270 B2 | Page 1 of 1 |
| APPLICATION NO. | : 12/167451 | |
| DATED | : August 16, 2011 | |
| INVENTOR(S) | : Gupta et al. | |

It is certified that error appears in the above-identified patent and that said Letters Patent is hereby corrected as shown below:

Col. 10, lines 35 & 36
The word "communications" should be removed from claim 16.

Signed and Sealed this
Fourth Day of October, 2011

David J. Kappos
*Director of the United States Patent and Trademark Office*